United States Patent

Ballu

[19]

[11] Patent Number: 5,586,725

[45] Date of Patent: Dec. 24, 1996

[54] DEVICE FOR PRODUCING AN AIR STREAM HAVING A FLATTENED SHAPE IN TRANSVERSE SECTION

[75] Inventor: Patrick J. Ballu, Reims, France

[73] Assignee: Tecnoma, Epernay, France

[21] Appl. No.: 338,738

[22] Filed: Nov. 9, 1994

[30] Foreign Application Priority Data

Nov. 10, 1993 [FR] France ................... 93 13437

[51] Int. Cl.$^6$ ........................................ A01G 25/09
[52] U.S. Cl. .................. 239/172; 239/166; 239/294; 239/419.5
[58] Field of Search ............... 239/172, 77, 29.4, 239/419, 419.3, 419.5, 423, 166, 167, 551

[56] References Cited

U.S. PATENT DOCUMENTS

| | | | |
|---|---|---|---|
| 2,735,719 | 2/1956 | Loe | 239/423 |
| 2,925,222 | 2/1960 | Spreng | 239/172 |
| 3,164,324 | 5/1963 | Bruinsma | 239/77 |
| 3,252,656 | 5/1966 | Greenwood | 239/77 |
| 3,472,454 | 10/1969 | Blue et al. | 239/77 |
| 3,994,437 | 11/1976 | Kitterman | 239/172 |
| 4,026,469 | 5/1977 | Frankel et al. | 239/78 |
| 4,375,954 | 3/1983 | Trudel | 239/419.3 |
| 4,634,054 | 1/1987 | Grusha | 239/423 |
| 5,052,622 | 10/1991 | Lindermeir et al. | 239/551 |
| 5,176,322 | 1/1993 | Sartor | 239/77 |
| 5,305,548 | 4/1994 | Siebol | 239/77 |
| 5,307,992 | 5/1994 | Hall et al. | 239/419.3 |
| 5,361,992 | 11/1994 | Broyhill | 239/172 |

FOREIGN PATENT DOCUMENTS

| | | | |
|---|---|---|---|
| 8801539 | 3/1988 | Australia | 239/77 |
| 1314453 | 11/1961 | France . | |
| 1257414 | 10/1989 | Japan . | |
| 2227399 | 1/1990 | United Kingdom . | |

Primary Examiner—Andres Kashnikow
Assistant Examiner—Lisa Douglas
Attorney, Agent, or Firm—Watson Cole Stevens Davis, P.L.L.C.

[57] ABSTRACT

A spray device, especially for agricultural use, includes a centrifugal compressor which sends compressed air to at least one injector (20) placed upstream of the throat (16) of a convergent-divergent, so as to entrain the surrounding air by a venturi effect. The convergent-divergent may itself be of flattened shape, but it is preferred to group several parallel convergents-divergents (14) together along a line parallel to the maximum extension of the section of the air stream to be created. The device includes blowing panels (7), with a box-type structure, which have the convergents-divergents passing through them in leak-tight fashion. The internal volume of the box structure (7) constitutes a compressed air manifold connected, on the one hand, to the compressor and, on the other hand, to the injectors (20) by pipes (21, 22, 23).

14 Claims, 3 Drawing Sheets

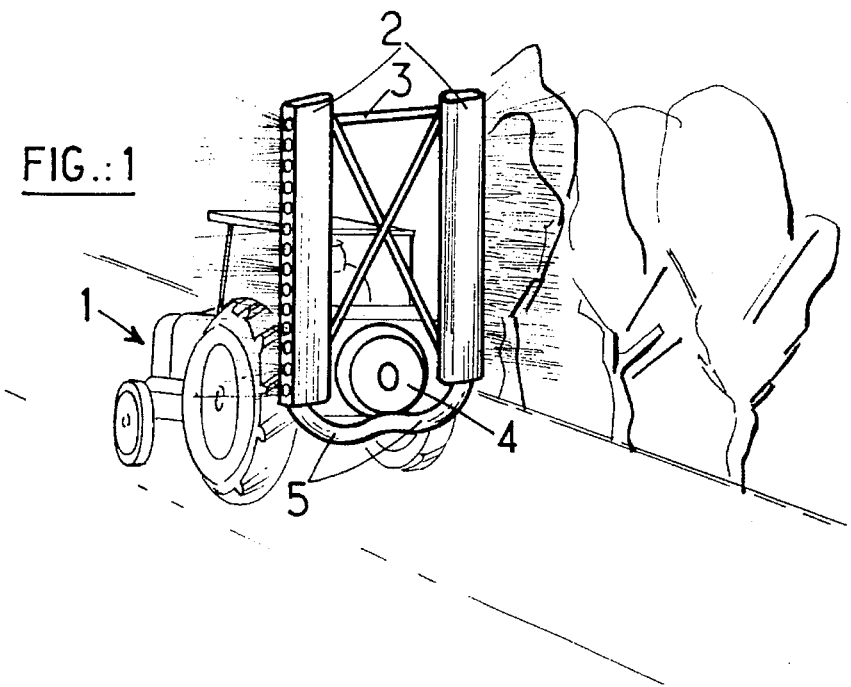
FIG.:1
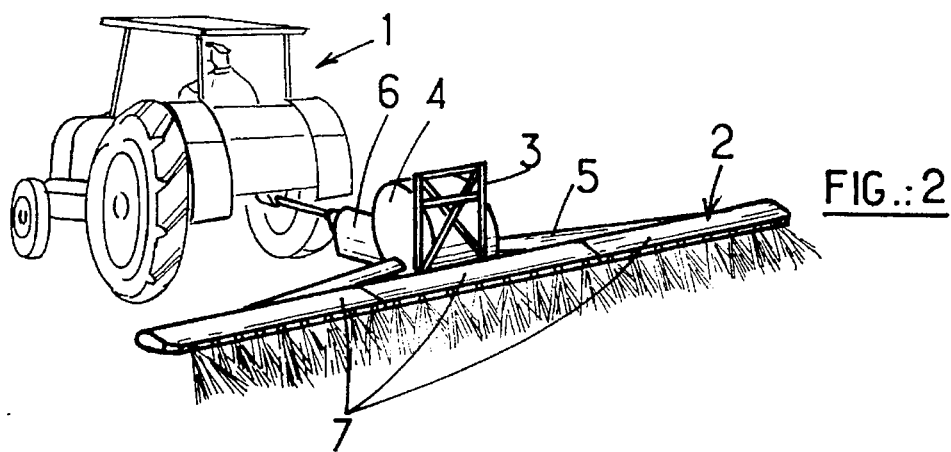
FIG.:2
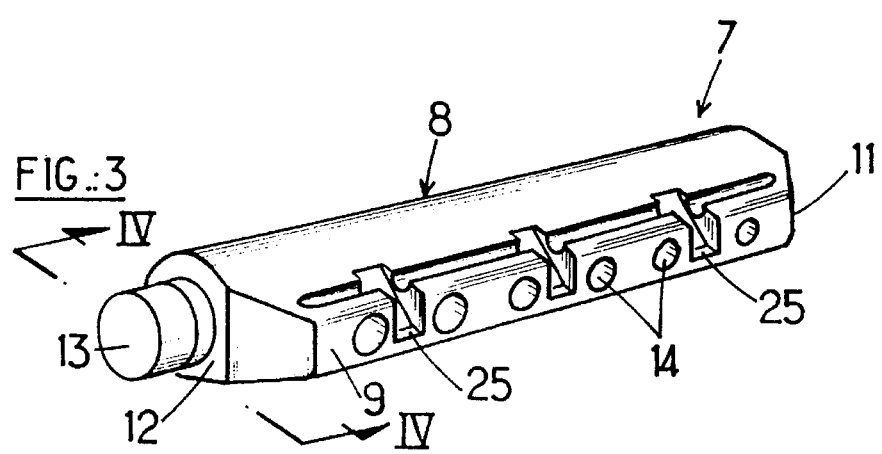
FIG.:3

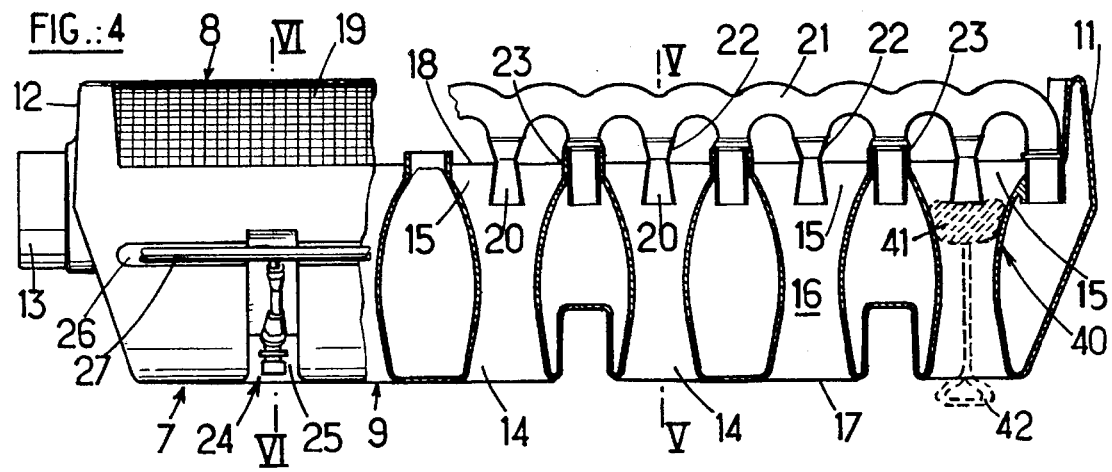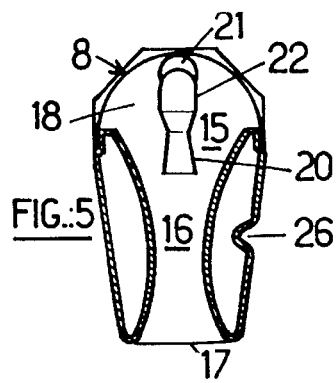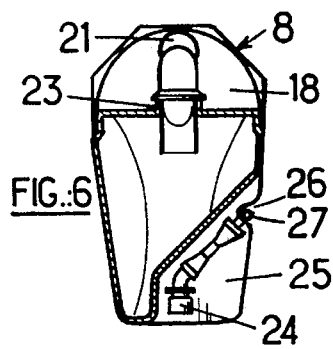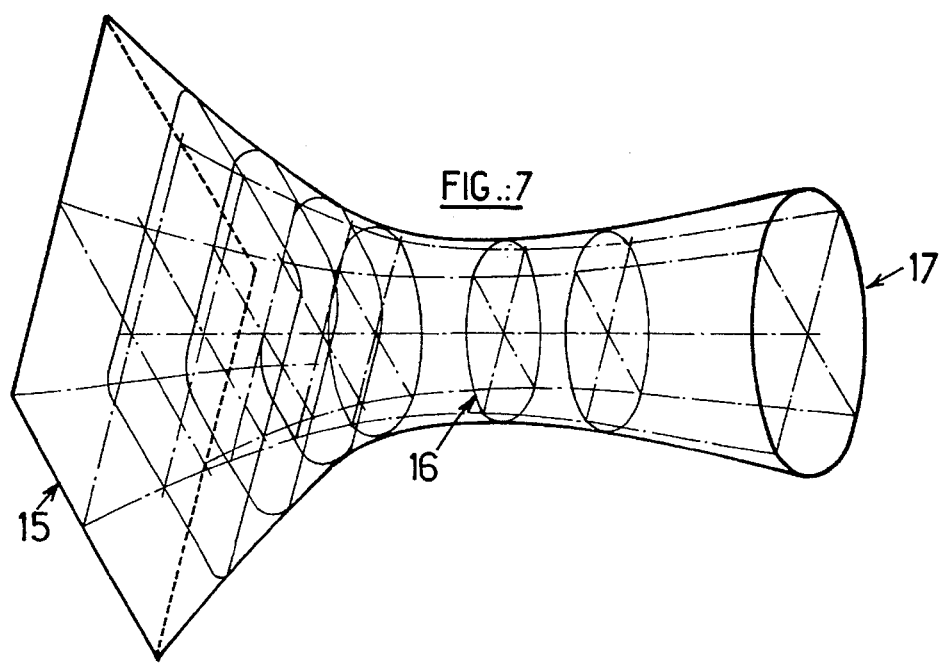

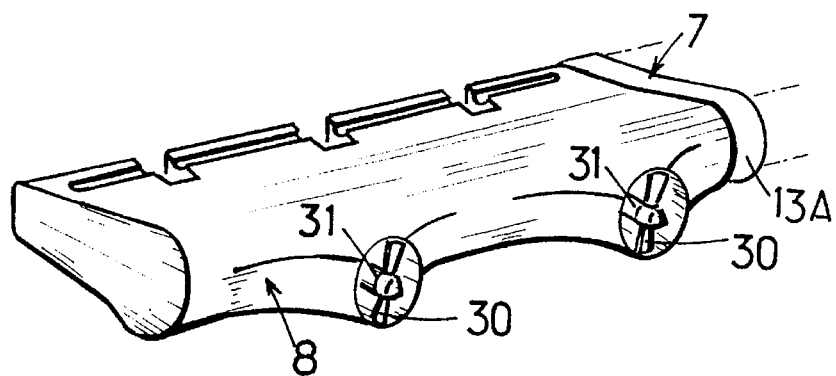
FIG.:8
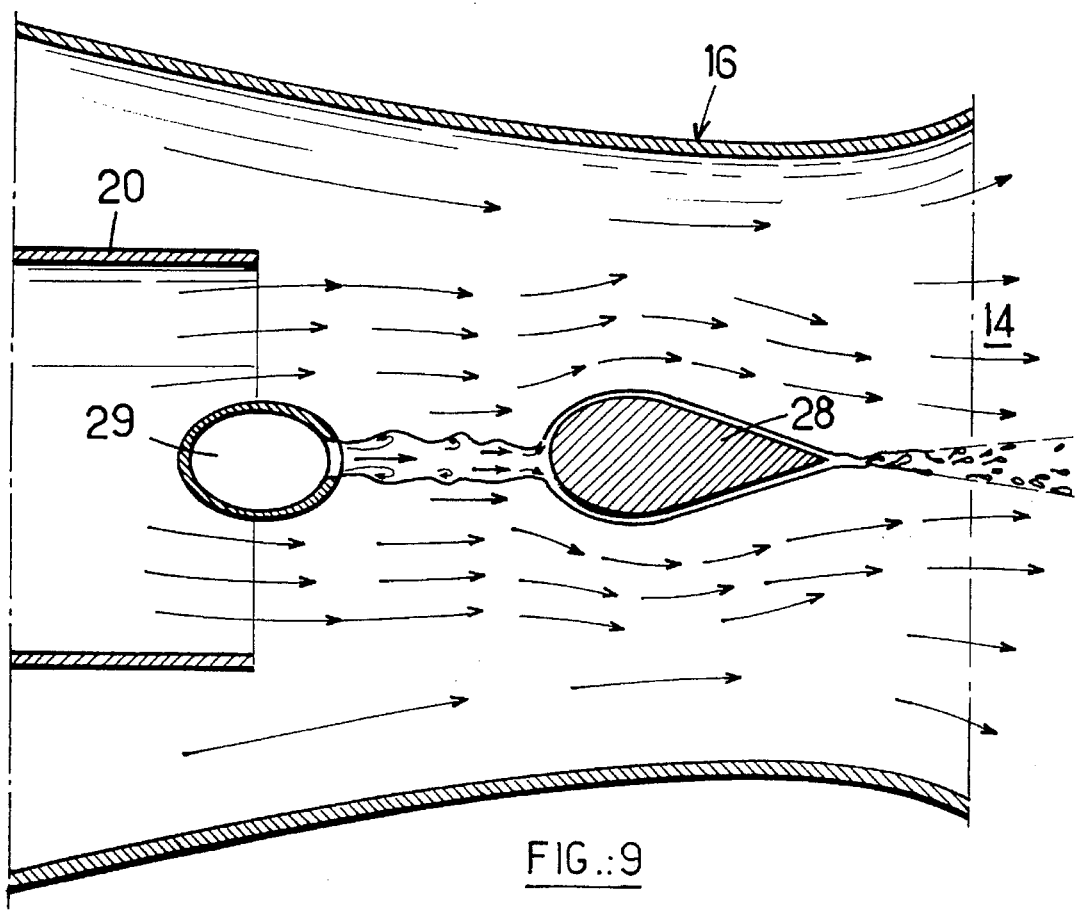
FIG.:9

5,586,725

DEVICE FOR PRODUCING AN AIR STREAM HAVING A FLATTENED SHAPE IN TRANSVERSE SECTION

TECHNICAL BACKGROUND

The present invention relates to a device capable of producing an air stream having a flattened shape in transverse section, particularly for spraying a treatment product over the ground or over plants.

In order to send an air stream laden with treatment product over the ground or over plants, use is usually made of two types of apparatus. A first type (U.S. Pat. No. 3,252,656 to GREENWOOD and U.S. Pat. No. 3,653,130 to PATRICK, and French Patent No. 1 314 453 to BERTHOUD) includes a helical blower which sprays a jet of air with high flow rate and modest speed in the direction of the axis of rotation of its fan. This air jet may be diverted with the aid of appropriate deflectors in order to be converted into an air stream with flattened transverse section but, if it is desired to create a sheet of air in parallel motion of large width, it is necessary to provide several blowers, each having its own deflectors.

A second type of apparatus (U.S. Pat. No. 4,026,469 to FRANKEL and U.S. Pat. No. 2,925,222, SPRENG) for producing an air stream comprises a single centrifugal compressor which delivers air at modest flow rate, at a relatively high pressure. The air thus compressed is conveyed through suitable pipes to nozzles which produce jets of air with high speed and small initial cross-section. The air jets produced, which may be of flattened shape in transverse section and which may all be located in one and the same plane, penetrate the air, and also the foliage of the plants, like daggers, that is to say, the air moves at high speed along the axis of each jet, but this air has an almost zero speed between the jets. This results in poor distribution of the treatment product.

In U.S. Pat. No. 3,164,324 to BRUINSMA, there is described apparatus which contains both a centrifugal compressor and helical blowers. The centrifugal compressor is used merely to produce a jet of air at high speed which is used to shred a jet of treatment liquid into fine droplets, which are injected, with the aid of the same high-speed air jet, along the axis of the air stream created by the helical blower. This complicated solution does not allow the drawbacks of apparatus with helical blowers to be overcome.

UK Patent Application No. 2.227.399 calls upon another technique, which is that of the venturi. According to this technique, a high-speed air jet is injected, by an injector formed of a nozzle or the like, axially at the inlet of a diffuser formed of a convergent-divergent pipe. The air jet imparts its energy to the air located inside the diffuser, so that an air flow with high flow rate and modest speed, similar to the one which a helical blower provides, may be obtained.

In order to obtain an air stream of flattened shape, provision is made, according to the document which has just been quoted, to use either a single diffuser which is straight in transverse section and of long length, fed by a series of injectors mounted on a manifold parallel to the diffuser, or a series of injector-diffuser assemblies, in which each diffuser has a closed, oval or circular cross-section and is associated with a single injector, connected to the manifold by a pipe.

The first solution is known to give good results only in a narrow range of flow rates, and the second solution results in a complex and unwieldy structure, complicated to fit together.

The object of the present invention is to provide a device which affords the performance of a system with several assemblies, each comprising a diffuser with closed cross-section associated with a single injector, and which may at the same time be constructed in a simple and inexpensive fashion.

SUMMARY OF THE INVENTION

In order to obtain this result, the invention provides a device for producing an air stream having a flattened shape in transverse section, this device comprising:

at least two diffusers, each one formed of a convergent-divergent pipe open at both ends, these diffusers being placed in the plane of the longest dimension of the transverse section of the air stream which it is desired to obtain, and an injector associated with each diffuser, more or less coaxial with the pipe forming the diffuser, and situated in its convergent part, being directed toward the divergent part, said injector being connected by compressed-air conveying means to a centrifugal compressor such that the compressed air produced by the compressor and sprayed by the injector sets the air located in the diffuser into motion or accelerates it, by a venturi effect, which device comprises a box structure which can be fed with compressed air by the centrifugal compressor and constitutes a manifold, this box structure having passing through it in leaktight fashion separate passages which are situated in the plane of the longest dimension of the transverse section of the air jet to be produced, these passages being of convergent-divergent shape and constituting the diffusers, and said injectors being placed inside the passages and being connected to the inside of the box structure by feed pipes.

The box-type structure affords, as is known, great rigidity for a weight which is very much less than that of more complex structures of the same rigidity. The specific shape of the box structure through which passages pass may be obtained, without any particular difficulty, by the current techniques of injection blow-molding of plastics.

Advantageously, the feed pipes of the injectors comprise an auxiliary manifold, which feeds each of the injectors via a pipe connected, via other pipes, to the inside of the box structure which forms a main manifold.

The whole of the device is thus made up by assembling two components with large dimensions but which are easy to obtain, the box structure and the manifold, and auxiliary components of low cost such as the abovementioned pipes.

In the case of a device including means for atomizing treatment product, which are located close to the outlets of the diffusers, in the direction of movement of the air, it is advantageous to make provision for these means also to be borne by the box structure. Advantageously, these means are spray heads placed in cavities of the box structure.

According to a yet more advantageous embodiment, the atomization means comprise a break-up piece which has a rounded edge pointing toward upstream of the gaseous flow and a ridge with a sharp angle pointing in the opposite direction, and a means for feeding with treatment liquid capable of creating, over at least part of the break-up piece, a substantially continuous coating of said liquid, the break-up piece and the feed means being placed in the region of the outlet of the injector and of the throat of the convergent-divergent formed by the passage.

In the case which has just been described, and if the atomization means are separately connected to a common feed pipe, for better protection, it is further advantageous to make provision for this pipe to be housed, at least in part, in a groove of the box structure and/or for this pipe to pass, at least in part, inside the box structure and/or inside a pipe for bringing compressed air into the box structure.

These structures make good use of the rigidity of the box structure in order to lighten and simplify the whole to the greatest possible extent without excessively complicating the manufacture of the box structure.

If the device is placed in fixed apparatus, the air in the diffuser is immobile when the injector is not in action. If the device is mounted on a vehicle, the air in the diffuser may move at a low speed as a function of the speed of the vehicle, the wind, and the orientation of the diffuser. This speed is usually relatively low.

According to an embodiment which is of benefit for producing powerful air streams, a helical blower is associated with the diffuser so as to create in the latter an air flow which will be accelerated by the venturi effect when the injector comes into action. A "supercharging" effect is thus created.

BRIEF DESCRIPTION OF THE DRAWINGS

The invention will now be described in more detail with the aid of practical examples which are illustrated with the aid of the drawings among which:

FIG. 1 is a diagrammatic perspective view of atomization apparatus equipped with devices according to the invention for creating air streams in the form of a vertical sheet.

FIG. 2 is a view similar to FIG. 1 but with a device in accordance with the invention installed in order to produce an air stream in the form of a horizontal sheet.

FIG. 3 is a diagrammatic perspective view of a unitary blowing panel in accordance with the invention.

FIG. 4 is a plan view, partially in section on the plane IV—IV of FIG. 3, of a blowing panel.

FIGS. 5 and 6 are transverse sections on the lines V—V and VI—VI of FIG. 4.

FIG. 7 is a diagram in perspective showing the form of a diffuser.

FIG. 8 is a view similar to FIG. 3, of an alternative.

FIG. 9 is an enlarged partial view of the section of FIG. 4, with another device for atomizing treatment liquid.

DETAILED DESCRIPTION OF EMBODIMENTS ACCORDING TO THE INVENTION

FIG. 1 shows a tractor 1 which bears two spray booms 2 located vertically to the left and to the right, supported by a gantry 3, a centrifugal compressor 4 mounted to the rear of the tractor, and pipes 5 connecting the compressor to each of the booms.

FIG. 2 shows a spray boom 2 mounted horizontally on a trailer 6 hitched to the tractor 1 and provided with a gantry 3. The centrifugal compressor 4 is also mounted on the trailer, and it is connected to the boom by pipes 5.

It will be noted that FIGS. 1 and 2 merely give non-limiting examples. The booms may well have other layouts and orientations, be it vertical, horizontal, or oblique, depending on the problems posed.

Each boom 2 is made up of a certain number of blowing panels 7, which are aligned, and which will now be described in more detail with the aid of FIGS. 3 to 6.

Each panel 7 has the shape of an elongate and flattened box structure, with a first edge, or intake edge, 8, in the form of a half cylinder, an opposite edge, or spraying edge, 9, which is thinner, and right-hand and left-hand edges 11, 12, which are substantially planar and converge toward the thin edge 9, the whole somewhat bringing to mind part of an airplane wing.

It will be noted that the denominations "right" and "left" are purely arbitrary: if the spray boom is vertical and perpendicular to the direction of travel, as in FIG. 1, one of the right- or left-hand edges is at the front in the direction of travel of the tractor, and the other is at the back. If the spray boom is horizontal, as in FIG. 2, one of the right- or left-hand edges is situated above, and the other below.

The panel 7 constitutes a leaktight box structure, provided at one of its ends with a cylindrical connector piece 13, which makes it possible to couple it in leaktight fashion to a neighboring box structure or to a compressed air inlet, and at the same time to adjust its orientation by pivoting about the axis of the connector piece 13. If several panels are placed in series, a connector piece 13 is provided at each of the ends of the intermediate panels.

According to a preferred embodiment, there is no real connector piece 13, but the ends of two successive box structures are open and connected to one another with the aid of sleeves, or rather by making provision for them to have a cross-section of slightly different size so that the smaller end is pushed, with sealing, into the other. FIG. 8 represents a box structure having a widened end 13A, but a different layout is possible. Of course, the connection means is independent of the supercharging device also shown in FIG. 8 and described later.

Such an embodiment allows simplified manufacture. For example, a box structure of long length can be made up by joining standardized lengths together and/or a box structure may be formed as components of long length which will be cut in order to form lengths of the desired length.

A certain number of mutually parallel passages 14 open out onto the spraying edge 9. They exhibit a convergent-divergent shape. As FIG. 7 shows, their transverse section varies progressively from a rectangular shape at their intake part 15 to a circular shape in the region of their throat 16 where the area of the cross-section is minimal. The outlet part 17, which joins the spraying edge 9, has a transverse section of circular shape. The diameter of the passage increases from the throat as far as the spraying edge. By comparison with a shape which is circular from one end to the other, such a shape makes it possible to increase the intake cross-section without changing the separation between neighboring passages.

The layout and/or the shape of the passages may be different from the one which is described, depending on the nature of the problems posed. In particular, it is possible for the passages 14 not to be parallel but to converge toward a point situated in front, in the direction of movement of air, for a more concentrated action at a distance from the device. They may equally well diverge, from a point situated to the rear, in the direction of movement of air, for a wider action. On the other hand, the outlet part 17 may also have a rectangular or flattened shape, for example for reasons of robustness or ease of construction, or in order to obtain a specific structure of the air jets.

It is important for the axes of the air jets together to constitute a continuous surface. This surface is normally a plane, but in specific cases, for example for treating shrubs having a particular shape, it may be conceived for it to have some other shape.

The intake part 15 of the passages 14 opens out into an intake chamber 18 connected to the outside by a grille 19 which constitutes the intake edge 8.

That part of the internal volume of the box structure 7 which is not occupied by the passages 14 or the intake chamber 18 constitutes a main manifold, filled with compressed air during the operation of the device.

Injectors 20 are placed so that they are coaxial with the passages 14. They are situated in the intake part 15 of each passage 14 and directed toward the throat 16.

The injectors 20 are connected to the main manifold, which feeds them with compressed air, by means of an auxiliary manifold 21 placed in the intake chamber 18.

The auxiliary manifold 21 extends over more or less the entire length of the intake chamber. It is connected to each injector 20 by a straight pipe 22, coaxial with the passage 14, and other straight pipes 23 which are parallel to the first pipes 22 connect the auxiliary manifold to the main manifold. The pipes 23 are located between two adjacent passages 14. As FIG. 4 shows, a very rigid, robust symmetrical structure is thus obtained with evenly distributed feed. It is, however, possible to envisage other embodiments. For example, each injector may be connected directly to the main manifold by a tube bent through 180°.

Close to the spraying edge 9 of the box structure 7 are placed spray heads 24 for a liquid treatment product. These spray heads are of the type which produce a flattened sheet of liquid droplets, this sheet being in the shape of a V, the vertex of which is on the spray head. The spray heads 24 are situated in the plane which contains the axes of the passages 14, and the spray heads are located so as to produce a sheet of droplets which is essentially in the same plane. One spray head is provided per two passages 14. It has been observed that, at a small distance from the box structure 7, there is obtained a homogeneous distribution of the treatment product in the air stream obtained with all of the diffusers 14 of the box structure operating together. It is, however, possible to envisage a different layout of the spray heads, for example spray heads placed so that they alternate with the outlets 17 of the diffusers, or in two lines situated on each side of the line of the outlets 17.

The spray heads 24 are placed in cavities 25 provided in one of the right- or left-hand edges 11, 12 of the box structure 7. The same edge exhibits a groove 26 perpendicular to the direction of the passages 14, and in which is accommodated a pipe 27 for feeding the spray heads with treatment product. The spray heads 24 are thus easy to access, while being protected from impact.

In an alternative embodiment, the spray heads are of the spinning disk type described in the U.S. Pat. No. 4,473,188. These spray heads produce a sheet of droplets sprayed by means of centrifugal force over an angular sector of the plane of the spinning disk. Here, the disk is located so that it produces a sheet of droplets which is more or less tangential to the sheet of air at the outlet of the diffusers.

In another alternative embodiment, the spray heads are spinning disks of which the plane is perpendicular to the direction of air flow. In the case of a spinning disk spray head, it will preferably be placed beyond the cavity 25 in the direction of air flow, or even in this air flow itself.

In the vicinity of the end of the box structure, the groove 26 is interrupted, and the pipe 27 penetrates inside the box structure in order to pass through the plane of junction between two adjacent box structures. The pipe 27 is thus protected in the zone of the junction.

In another beneficial alternative embodiment, illustrated in FIG. 9 there is provided, in the region of the outlet 17 of the injector 20 and of the throat 16 of the venturi formed by the passage 14, a "break-up piece" 28 which has a rounded edge pointing toward upstream of the gaseous flow and a ridge with a sharp angle pointing in the opposite direction, and a means 29 for feeding with treatment liquid capable of creating, over at least part of the break-up piece, a substantially continuous coating with treatment liquid.

In the example described in FIG. 9, the feed means 29 is a tube which is connected to the pipe 27 and exhibits suitably located orifices. The tube 29 passes through the wall of the passage 14, it is mounted as an extension of the pipe 27, which is therefore entirely inside the box structure, and there is neither cavity 25 nor groove 26.

In an alternative embodiment illustrated in FIG. 8, the intake edge 8 is not made up of a grille, but of a solid metal sheet in which there are located small helical blowers 30 laid out in order to send air into the intake chamber 18, and to create, within the intake part 15 of the passages 14, an air stream which will be accelerated by venturi effect under the action of the air jet produced by the injector 20. A "supercharging" effect is thus obtained which substantially improves the efficiency of the diffuser-injector assemblies.

The layout and number of the blowers 30 have, of course, to be matched to the problem posed and to the shape of the device. The motors 31 for driving the blowers 30 may be electric motors or hydraulic motors. The blowers may equally well be driven by a transmission shaft connected to a common engine, which may be that of the carrying vehicle.

In the drawings, the blowing panel 7 has been represented as a single piece, of quite large dimensions. The current art makes it possible to make such components without major difficulties. However, it may be preferable to make up the blowing panel by assembling unitary elements, preferably identical ones, each one corresponding to a single passage 14 or to a small number of passages. Thus the dimension of the blowing panel can easily be matched to the requirement, at the factory.

The modular structure of the device makes it possible to match its dimensions rapidly to the needs. However, in the case of it being desirable to modify temporarily the number of passages 14 in action, it is advantageous to provide stoppers which have a shape designed to close off at least one injector, these being held in place by the convergent part of the corresponding passage.

Represented in FIG. 4, in dashed lines, is such a stopper 40 made up of a mass 41 of deformable plastic which closes off the injector 20, being held by the convergent part of the venturi. A handle 42 is used to install and remove the stopper. In the case represented in the figure, the mass 41 also closes off the passage 14, which is advantageous but not indispensable.

I claim:

1. A device for producing an air stream having a flattened shape in transverse section, this device comprising:

at least two diffusers, each diffuser being formed of a convergent-divergent pipe which is open at both ends, said diffusers being placed in a plane of the longest dimension of the transverse section of the air stream which it is desired to obtain, and an injector associated with each diffuser, generally coaxial with the pipe forming the diffuser, and situated in its convergent part, being directed toward the divergent part, said injector being connected by compressed air conveying means to a centrifugal compressor such that the compressed air produced by the compressor and sprayed by the injector sets the air located in the diffuser into motion or accelerates it, by a venturi effect, said device further comprising a box structure which can be fed with compressed air by the centrifugal compressor and constitutes a main manifold, said diffusers being mounted in said box structure so as to be situated in said plane of the longest dimension of the transverse section of the air jet to be produced, and wherein said injectors are placed inside said diffusers and are connected to the inside of the box structure by feed pipes.

2. The device of claim 1, wherein the feed pipes of the injectors comprise an auxiliary manifold, which feeds each of the injectors via a pipe connected, via other pipes, to the inside of the box structure which forms said main manifold.

3. The device of claim 1, further including atomizing means for atomizing treatment product, said atomizing means comprising output orifices located close to the outlets of the diffusers, in the direction of movement of the air, said atomizing means also being borne by the box structure.

4. The device of claim 3, wherein said output orifices are carried by spray heads placed in cavities of the box structure.

5. The device of claim 3, wherein said atomizing means comprise a break-up piece which has a rounded edge pointing toward upstream of the gaseous flow and a ridge with a sharp angle pointing in the opposite direction, and a means for feeding with treatment liquid capable of creating, over at least part of the break-up piece, a substantially continuous coating of said liquid, the break-up piece and the feed means being placed in the region of an outlet of the injector and of a part of minimal cross-section of the convergent-divergent formed by the passage.

6. The device of claim 3, wherein said atomizing means are separately connected to a common feed pipe housed, at least in part, in a groove of the box structure.

7. The device of claim 3, wherein said atomizing means are separately connected to a common feed pipe which passes, at least in part, inside the box structure.

8. The device of claim 1, wherein the passage of at least one said diffuser passing through the box structure exhibits an overall rectangular shape in cross-section in an intake zone of its convergent part, and exhibits an overall circular section in an outlet zone of its divergent part.

9. The device of claim 1, wherein at least one helical blower is associated with at least one diffuser so as to create in the latter an air flow which will be accelerated by venturi effect when the injector comes into action, and so as to produce a supercharging effect.

10. The device of claim 1, said device being made up as an assembly of unitary box structures connected to one another in leaktight fashion.

11. The device of claim 10, wherein adjacent box structures are open at their ends which face each other, and connected together by sleeves.

12. The device of claim 10, wherein the adjacent box structures are open at their ends which face each other, and connected together by fitting into each other.

13. The device of claim 1, including stoppers which have a shape designed to close off at least one injector, being held in place by the convergent part of the corresponding passage.

14. A spray apparatus for producing an air stream having a flattened shape in transverse section, said apparatus comprising:

an elongated housing defining a main manifold through which compressed air from a centrifugal compressor can flow, said elongated housing defining a spray edge;

a plurality of diffusers located in said housing, each diffuser comprising wall means defining a passage which converges from an inlet within the elongated housing to a throat and then diverges from said throat to an outlet mouth in said spray edge, said diffusers being spaced along the length of said elongated housing; and an auxiliary manifold for compressed air extending within said elongated housing, said auxiliary manifold including feed pipes mounting injectors which are respectively located within convergent portions of respective diffusers so as to direct compressed air towards said divergent portions and out of said outlet mouths.

* * * * *